(No Model.) 2 Sheets—Sheet 1.
J. HARTER.
Road Scrapers.
No. 235,431. Patented Dec. 14, 1880.
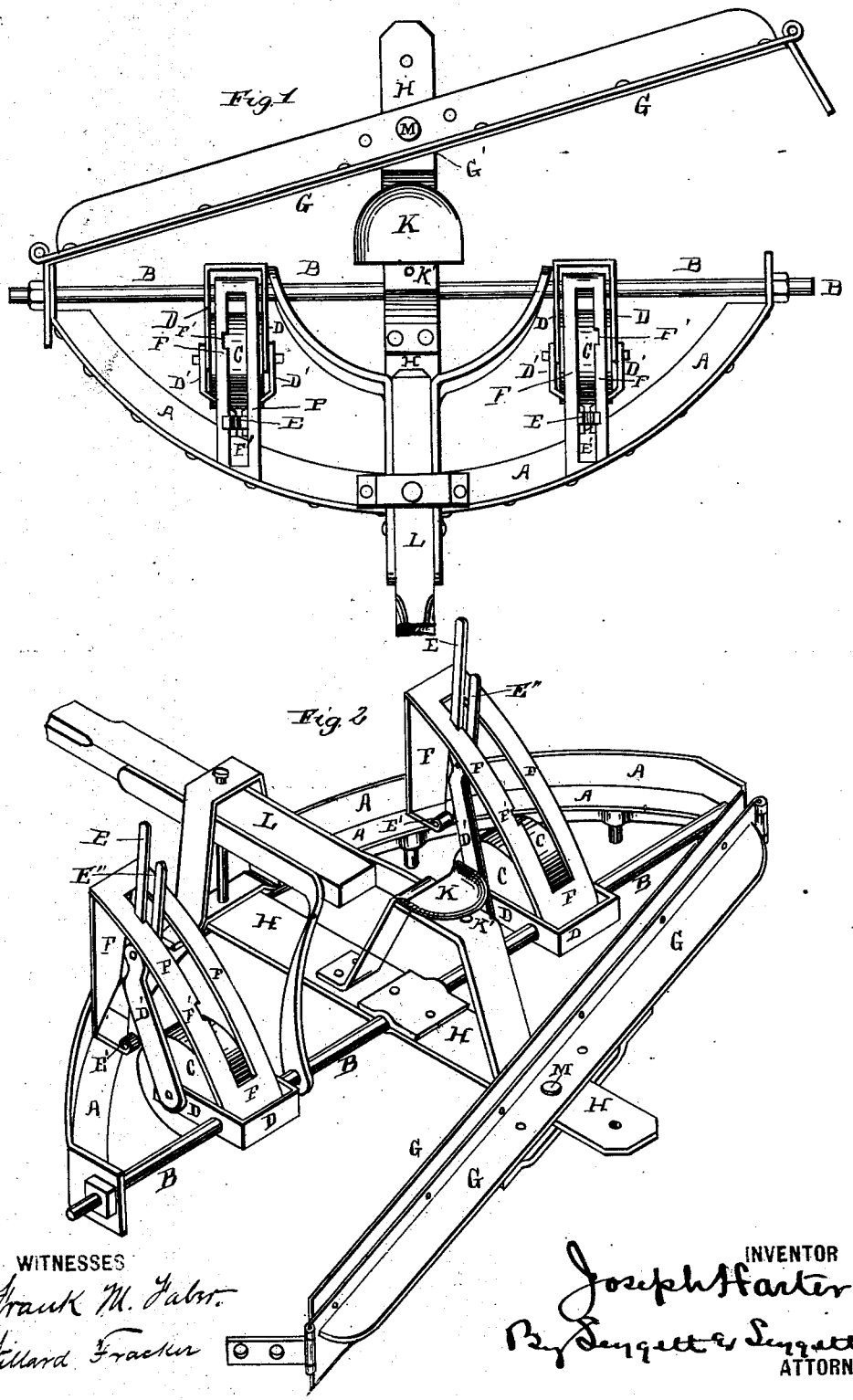
WITNESSES
Frank M. Faber
Willard Fracker
INVENTOR
Joseph Harter.
By Leggett & Leggett
ATTORNEY

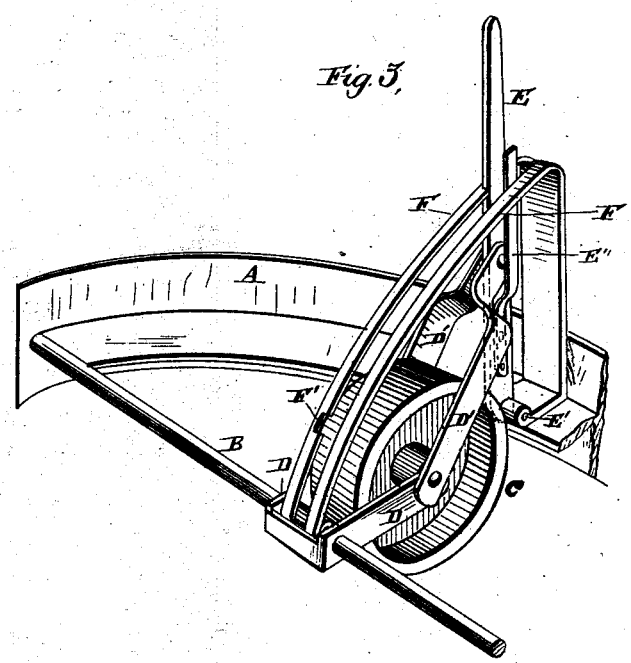

UNITED STATES PATENT OFFICE.

JOSEPH HARTER, OF TIFFIN, OHIO.

ROAD-SCRAPER.

SPECIFICATION forming part of Letters Patent No. 235,431, dated December 14, 1880.

Application filed April 7, 1880. (No model.)

*To all whom it may concern:*

Be it known that I, JOSEPH HARTER, of Tiffin, in the county of Seneca and State of Ohio, have invented certain new and useful Improvements in Road-Scrapers; and I do hereby declare the following to be a full, clear, and exact description of the invention, such as will enable others skilled in the art to which it pertains to make and use it, reference being had to the accompanying drawings, which form part of this specification.

My invention relates to road-scrapers.

In the drawings, Figure 1 is a plan view of my device; Fig. 2, an isometric view thereof. Fig. 3 is a detailed view of the lever and its connections for adjusting the truck-wheels.

My invention consists in the following parts and combinations, as will be hereinafter specified and claimed, wherein—

A is what may be called the "rake," "harrow," or "pulverizer," formed either V-shaped or, preferably, arched, or in the segment of a circle, as shown in the drawings. The rake A may have its teeth detachably attached, according to fancy or requirements, and these teeth may be of any suitable character, as their specific form does not constitute any part of my invention.

B is a rod or shaft connecting the two ends of the rake A.

C C are two vertically-adjustable truck-wheels mounted upon knuckle-joints. These knuckle-joints consist of an arm or frame, D, pivotally attached to the rod B. The second arm, D', of the knuckle-joint connects the free end of the frame D with the adjusting-lever E, which lever is in its turn pivotally attached to the rake-frame A at E'.

E is a spring-actuated lever secured at its lower end to the adjusting-lever E, and bears against the inner edge of one of the guides F, thereby retaining the lever E in snug contact with the inner edge of the opposite guide F, and serving to retain it against accidental displacement in either one of the notches F'.

F are guides, within which move the adjusting-levers E, and are provided with notches F', of any suitable number, whereby the levers E may be adjusted at any desired position.

It will be observed that by operating the levers E the knuckles D D', which carry the truck-wheels C, will be opened or closed, thus raising or lowering the said truck-wheels C, and thus the rake A and scraper G will be more or less lifted up from the ground.

The scraper G is attached at one end to the rake-frame A. This scraper should be so constructed that either of its ends may be attached to the frame A and either of its edges be brought into contact with the earth.

A slot, G', is made in the scraper G, through which passes the reach H. This reach is rigidly attached at its forward end to the rake-frame A. It also clamps the rod B, and then passes out through the slot G' of the scraper G. Upon this reach any suitable driver's seat, K, may be located, and by means of two or more holes, K', the seat may be adjusted nearer to or farther from the driver.

L is the tongue, which is pivotally attached to the rod B.

M is a pin which passes through holes made in the scraper device and reach H, whereby said scraper may be retained at any pitch or angle to which it may be adjusted.

What I claim is—

1. The combination, with the arched harrow, rake, or cultivator A and rod or bar B, attached to the opposite ends thereof, of one or more knuckle-jointed truck-frames pivoted at one end to bar B, and operating-lever E, pivoted to the harrow A, and having the forward end of the knuckle-jointed truck-frame pivoted thereto, substantially as set forth.

2. The combination, with the arched harrow, rake, or cultivator A and rod or bar B, attached to the opposite ends thereof, of a guide-frame, F, provided with notches F', said guide-frame being secured at opposite ends to the arched frame A and rod B, and a knuckle-jointed truck-frame pivoted at one end to bar B and at its opposite end to lever E, the latter being pivoted to frame A, substantially as set forth.

3. A road-scraper consisting of a single transverse bar, beam, or rod, B, to which is attached or connected a draft-pole or tongue, L, a forward arched harrow, rake, or cultivator, A, two or more vertically-adjustable wheels or trucks, C, and an adjustable rear scraper, G, constructed with detachably-attached scraping blades or plates adapted to be used either side up, and adapted also to be attached by either end to said rake A, and provided with suitable device for being retained at any slant to which it (the said scraper-blade) may be adjusted.

In testimony whereof I have signed my name to this specification in the presence of two subscribing witnesses.

JOSEPH HARTER.

Witnesses:
 JNO. CROWELL, Jr.,
 L. L. LEGGETT.